United States Patent [19]
Sutton

[11] Patent Number: 5,872,823
[45] Date of Patent: Feb. 16, 1999

[54] RELIABLE SWITCHING BETWEEN DATA SOURCES IN A SYNCHRONOUS COMMUNICATION SYSTEM

[76] Inventor: Todd R. Sutton, 11275 Caminito Rodar, San Diego, Calif. 92126

[21] Appl. No.: 832,582

[22] Filed: Apr. 2, 1997

[51] Int. Cl.[6] .......................... H04L 25/36; H04L 25/40; H04L 7/00
[52] U.S. Cl. .......................... 375/372; 370/235; 370/236; 375/356
[58] Field of Search .................................. 375/371, 372, 375/354, 356, 357; 370/503, 465, 468, 235, 236, 428, 429; 327/162, 163; 455/502, 561

[56] References Cited

U.S. PATENT DOCUMENTS

| | | | |
|---|---|---|---|
| 4,569,062 | 2/1986 | Dellande et al. | 375/357 |
| 4,596,026 | 6/1986 | Cease et al. | 375/372 |
| 4,916,717 | 4/1990 | Sackman, III et al. | 375/371 |
| 5,014,271 | 5/1991 | Fujimoto et al. | 375/372 |
| 5,140,611 | 8/1992 | Jones et al. | 375/362 |
| 5,172,396 | 12/1992 | Rose, Jr. et al. | 375/107 |
| 5,206,831 | 4/1993 | Wakamatsu | 365/200 |
| 5,222,108 | 6/1993 | Suzuki | 375/372 |
| 5,396,492 | 3/1995 | Lien | 370/466 |
| 5,398,241 | 3/1995 | Witchey | 370/84 |
| 5,506,993 | 4/1996 | Fitch et al. | 395/800 |
| 5,526,362 | 6/1996 | Thompson et al. | 375/371 |
| 5,563,920 | 10/1996 | Fimoff et al. | 375/354 |

*Primary Examiner*—Chi H. Pham
*Assistant Examiner*—Emmanuel Bayard
*Attorney, Agent, or Firm*—Russell B. Miller; Roger W. Martin; Thomas R. Rouse

[57] ABSTRACT

First and second data sources transmit a data signal on a data connection and a transmit clock signal on a clock connection. The data signal is clocked into a FIFO resident in the network interface equipment in response to the transmit clock signal, and out of the FIFO to the network in response to a reference clock signal. The FIFO generates a signal indicating how full it is and a local clock generator which generates the transmit clock signal in response to this status indication signal. The first and second data sources hold the data signal and transmit clock signal high for longer than a single period of the reference clock signal when switching between them. The local clock generator alters an average rate of the transmit clock signal in response to the status indication signal from the FIFO in order to keep it half-full.

18 Claims, 6 Drawing Sheets

RELIABLE SWITCHING BETWEEN DATA SOURCES IN A SYNCHRONOUS COMMUNICATION SYSTEM

BACKGROUND OF THE INVENTION

I. Field of the Invention

The present invention relates to synchronous communication of data. More particularly, the present invention relates to a novel and improved method and apparatus for switching between two or more different data sources on a synchronous data port having an external timing reference.

II. Description of the Related Art

In the field of data communications, several well-known standards exist for communicating serial data from one communication device to another communication device. These standards include RS-232, RS-422, T1, and E1 and the like. In accordance with these standards, binary data is transmitted over a serial communication line by a serial driver device, and received at the other end of the serial communication line by a serial receiver device. In a synchronous data communication system, this binary data is transmitted according to the timing of a reference clock signal.

In a communication system where high-speed, reliable data communication is required, such as in a telecommunications network application, redundant communication resources are often provided. For example, the system architecture may provide a "one plus one" redundancy scheme for serial driving devices so that if one driver fails, the other will be switched onto the communication line in order to provide continuing data communication with the receiver device.

An example of a wireless communication system which uses high-speed, redundant communication resources may be found in U.S. patent application Ser. No. 08/513,306, filed Aug. 9th, 1995, entitled "METHOD AND APPARATUS FOR PROVIDING A RELIABLE PACKET SWITCHED INTERCONNECTION SYSTEM," assigned to the assignee of the present invention and incorporated herein by reference. In the just-mentioned patent application, a redundant packet switching architecture is disclosed which comprises a cellular base station in communication with the Public Switched Telephone Network (PSTN) through an ISDN switch. Hardware redundancy is provided among network interface resources that interface the cellular base station to the PSTN.

For example, consider the wireless communication system 100 of FIG. 1. FIG. 1 illustrates a Base Station Transceiver Subsystem (BTS) 102 in communication with a Base Station Controller Subsystem (BSC) 114. On the forward link, BSC Distribution and Consolidation Subsystem (BSC DISCO) 118 routes voice signals and other data from various sources (not shown) to BSC Network Interface Equipment (BSC NIE) 116 for further routing to BTS 102. BSC NIE 116 routes the voice signals and data and also clock signals over T1, line 112 to BTS Network Interface Equipment (NIE) 110. NIE 110 and 116 which may each be an Inverse Multiplexer (IMUX), Channel Service Unit (CSU), or other conventional type of interface, translate between the T1, format and a Base Station Communication Network (BCN) format. BTS NIE 110 passes the data over lines 108 to at least one of the N Base Station Communication Network Interface Cards (BCNIC) 106A–106N resident in BTS DISCO 104. BTS DISCO 104 then routes the incoming data to the appropriate BTS 102 resources (not shown) which, in turn, transmit the data to one or more Mobile Stations (MS) 101. The converse path is followed for the reverse link from the MS to the BSC. BSC DISCO 118 and BTS DISCO 104 are similar in nature and structure and are further described in the above mentioned U.S. patent application Ser. No. 08/513,306. BSC DISCO 118 may also employ the present invention, and communicate with other BSC's (not shown).

As shown in FIG. 1, hardware redundancy on the order of 1:N may be provided for BCNICs 106A–106N. When one of the BCNICs fails, for example BCNIC 106A, the redundant BCNIC 106N is automatically switched in to replace the failed unit. Furthermore, in an effort to prevent catastrophic failure, the BCNICs 106A–106N are sequentially tested by Controller 105 taking one at a time "off-line" to perform diagnostic and functional testing as described in the above-mentioned patent application Ser. No. 08/513,306. As each of the BCNICs 106A–106N completes off-line testing, it is placed back in service, and the next BCNIC 106A–106N is then removed from service to be tested. This cyclic sequential testing controller by controller 105 is often referred to as "roving test," and decreases the probability of a catastrophic failure by orders of magnitude. Thus, there are two ways in which the BCNICs 106A–106N are switched in and out of service; for maintenance purposes (i.e. "roving" ), and also upon actual failure.

When switching between these redundant communication resources, it is clearly desirable to eliminate any loss or corruption of data, because the data may not be recoverable, and in any case, it may take a significant amount of time to re-synchronize the BTS NIE 110 with the BSC NIE 116 after discovering the error and perhaps resetting. At very high data rates, such as on the order of 10 Mbps, the problem of error-free switching between redundant data sources is exacerbated by the finite switching time necessary to bring an "off-line" data source to an "on-line" state. That is to say that it may not be possible to reliably and automatically switch one BCNIC 106A "off-line" and also switch a replacement BCNIC 106N "on-line" within a single clock pulse at high data speeds.

For example, consider a BCNIC 106A clocking data in/out to the BTS NIE 110 at an exemplary data rate of 10 Mbps. At this rate, the clock period is 100 ns, which means one clock pulse is either "high" or "low" for only 50 ns. If one takes into account the realities of clock jitter, clock skew, and lot-to-lot component variation among clock drivers, the clock pulse will not be perfectly square, and may only be 30 ns or 40 ns in duration. In order to make a reliable switch between the two redundant cards without losing data, the "off-line" BCNIC 106N would need to detect the proper clock edge, and then turn on its data drivers, whereas the "on-line" BCNIC 106A would need to properly detect the same clock edge, and then turn off its drivers after the "off-line" BCNIC 106N had turned its data drivers on. This manner of switching is often referred to as "make before break". There is a high probability that not all of these events would occur properly, in which case both BCNICs 106A and 106N could be driving data out during this same time, causing contention which could last for more than a single clock pulse, perhaps longer than 50 ns, and result in errors in the data. Alternately, the failure to make an effective "make before break" switch could result in a period where neither BCNIC 106A or 106N is driving data or clock signals. Thus, a method and system is needed to provide reliable switching among redundant high-speed data sources.

In a conventional network interface between a BSC NIE 116 and a BTS NIE 110 over a T1, line 112, BSC NIE 116 the provides a network reference clock signal for synchronous communications of data. The BTS NIE 110 may derive a local transmit clock signal from the network reference clock, an internal oscillator (not shown), or perhaps a separate stable time reference such as a GPS receiver (not shown). BTS NIE 110 provides the local transmit clock to the BCNICs 106A–106N. In response to the local transmit clock signal, data is clocked out from the BCNIC 106A–106N, and into the BTS NIE 110. In response to the network reference clock signal provided by BSC NIE 116, data is clocked out from the BTS NIE 110 over the T1, line 112 to the BSC 114 for further routing to its destination address. By industry standards, the data clocked out on the T1, line 112 between the BSC NIE 116 and the BTS NIE 110 is packetized into frames, with the 193rd bit in each frame being reserved for overhead signaling or synchronization use. Since no user data is provided on the forward link from the BSC NIE 116 during this 193rd bit, the BTS NIE 110 generally does not provide user data to the BSC NIE 116 on the reverse link in response to the 193rd network reference clock signal either, and thus the BTS NIE 110 generally does not replicate the 193rd network reference clock signal in generating its local transmit clock signal for use by the BCNICs 106A–106N. It should be noted that there may be some delay between the 193rd network reference clock signal and the local transmit clock signal.

In the BTS NIE 110, it is a conventional design matter to provide a FIFO (not shown in FIG. 1) in the serial data path and buffer the data in order to account for uncertainties in this network clock signal caused by such things as cable length delay (which may be on the order of 1.5 ns per foot), internal delays within the BSC 114 switching equipment and the BTS 102 equipment, and clock tolerances. Such a FIFO is also useful for allowing a "margin of safety" needed when switching or "roving" between redundant data sources, such as the BCNICs 106A–106N. The "margin of safety" provided by such a FIFO is proportional to its depth. The deeper the FIFO, the more data can be stored, and thus the longer it would take to overflow if data was clocked into it by the BCNIC 106A–106N faster than it was clocked out onto the T1, line 112 by the NIE 110. However, deeper FIFOs generally cost more than shallower ones. Additionally, regardless of how deep a FIFO is, it may still fail to prevent data errors if it underflows if the BCNIC 106A–106N missed several clock pulses from the network, and thus failed to send any data. In either case, an underflow or an overflow would generally causes a reset of the NIE 110 and the accompanying re-synchronization time.

In a perfect system, the FIFO in the NIE 110 would remain one-half full. Additionally, in that perfect system, the switching among redundant data sources would occur instantaneously without any errors or gaps in the data. However, due to the uncertainties mentioned above, as well as the need for high-speed data communications there is a clear need for a reliable high-speed data system that can reliably switch between redundant data sources without introducing data errors.

SUMMARY OF THE INVENTION

The present invention is a novel and improved system and method for synchronously communicating data to a network having a reference clock signal. The system includes first and second data sources, each coupled to a data connection and a clock connection, each for transmitting a data signal on the data connection and a transmit clock signal on the clock connection. The data signal and clock signal are clocked into a FIFO resident in the NIE in response to the transmit clock signal. The FIFO provides the data signal to the network in response to the reference clock signal. The FIFO generates a status indication signal, indicative of how full it is and provides this status indication signal to a local clock generator which generates the transmit clock signal in response to the reference clock signal. The system may further include a controller for switching between the first and second data sources.

In the system of the present invention, each of the first and second data sources holds the transmit clock signal at a predetermined logic level for longer than a duration of a single period of the reference clock signal when switching between the first and second data sources. Furthermore, each of the first and second data sources holds the data signal at a predetermined logic level for longer than a duration of a single period of said reference clock signal when switching between the first and second data sources. This "gapping" of the clock and data signals enables the first and second data sources to execute a seamless "make before break" switch at high speeds without corrupting data or clock signals. In a preferred embodiment, the first and second data sources each comprise a processor for formatting the data signal to a predetermined data format having data frames demarked by sync flags, and the system switches between the first and second data sources only during one of the sync flags.

In order to overcome the FIFO underflow that might occur due to repeated switches in the present invention, the FIFO generates a status indication signal. The local clock generator alters an average rate of the transmit clock signal in response to this status indication signal. Specifically, the local clock generator increases an average rate of said transmit clock signal when said FIFO contains less than a predetermined number of data bits and either decreases or keeps constant the average rate of the transmit clock signal when said FIFO contains more than a predetermined number of data bits. In the preferred embodiment, the predetermined number of data bits is approximately one-half of a data bit capacity of said FIFO. Thus, the present invention may compensate for the "gapped" clock pulses, and "catch up" with the external network reference clock signal, keeping the FIFO half-full.

The local clock generator may be implemented in at least two embodiments. In the first embodiment, the local clock generator comprises a logic circuit having a first input coupled to the network for receiving the reference clock signal, a second input coupled to the FIFO for receiving the status indication signal, and an output for providing the transmit clock signal to the first and second data sources. The logic circuit suppresses one of every N pulses of said reference clock signal if the FIFO contains more than a predetermined number of data bits and does not suppress any of the reference clock signal pulses if the FIFO contains less than a predetermined number of bits. In the exemplary T1, system, N equals 193. Thus, the 193rd reference clock signal pulse, which corresponds to the signaling or overhead bit of the T1, format, is not suppressed if the FIFO is less than half full. This increases the average rate of the transmit clock signal by 193/192, allowing the data rate into the FIFO to catch up with the data rate out of the FIFO, thereby keeping it half full.

In a second embodiment, the local clock generator comprises a voltage controlled oscillator (VCO) circuit having a first input coupled to the network for receiving the reference clock signal and a second input coupled to the FIFO for receiving the status indication signal and an output for providing the transmit clock signal to the first and second data sources. In this second embodiment, the VCO circuit varies a frequency of the transmit clock signal in response to a voltage level of the status indication signal, increasing the frequency of the transmit clock signal when the FIFO is less than half full, and either decreasing or keeping constant the frequency of the transmit clock signal when the FIFO is greater than half full. This second embodiment further comprises a loop filter having an input coupled to the FIFO for receiving the status indication signal and an output coupled to the second input of the VCO circuit and interposed therebetween, the loop filter for filtering the status indication signal.

The present invention also provides a method for operating the system, thereby providing a reliable high-speed data system that can reliably switch between redundant data sources without introducing data errors.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
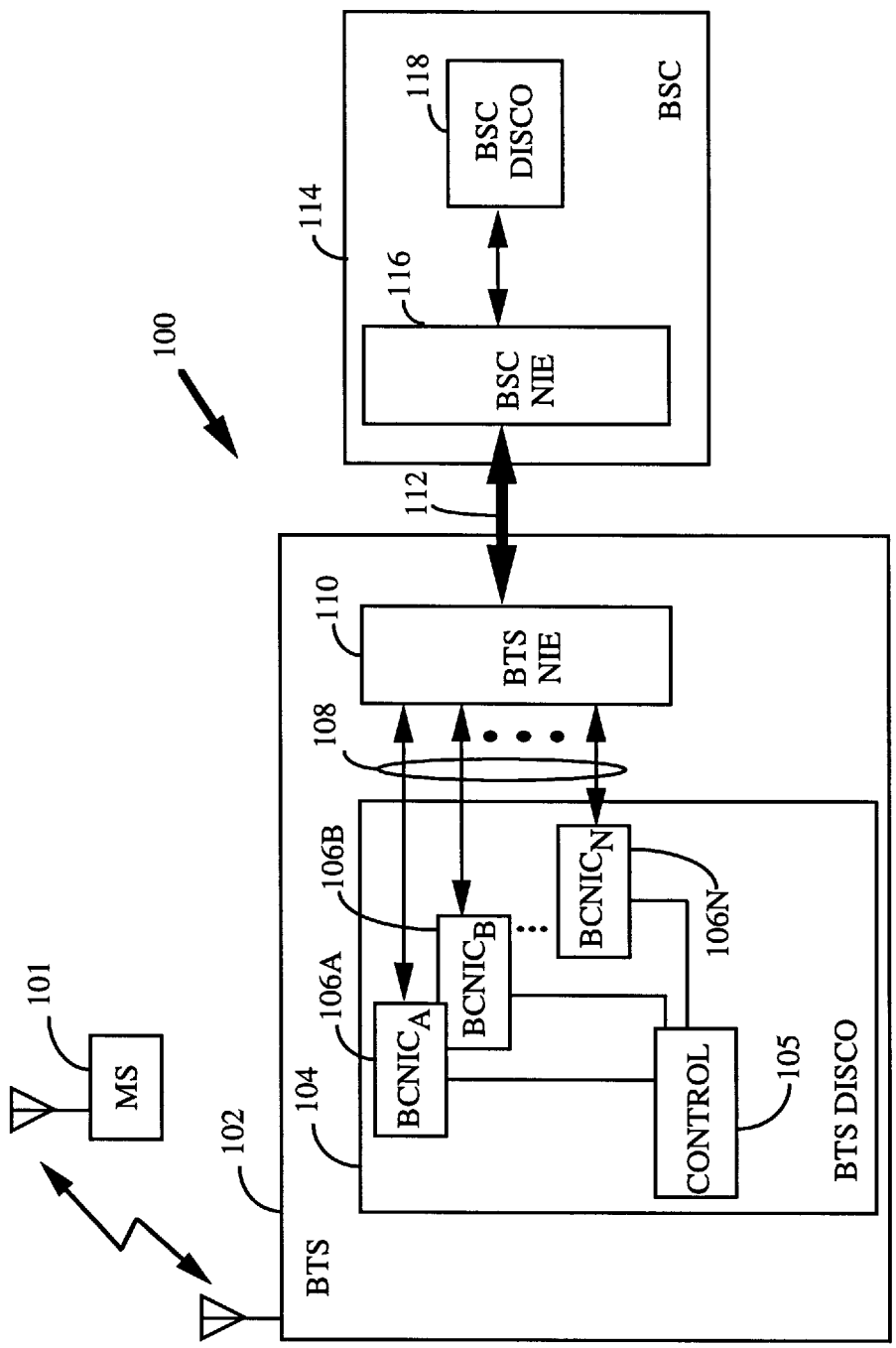
FIG. 1 is a high-level block diagram of a communication system suitable for use with the present invention.
Figure 2:
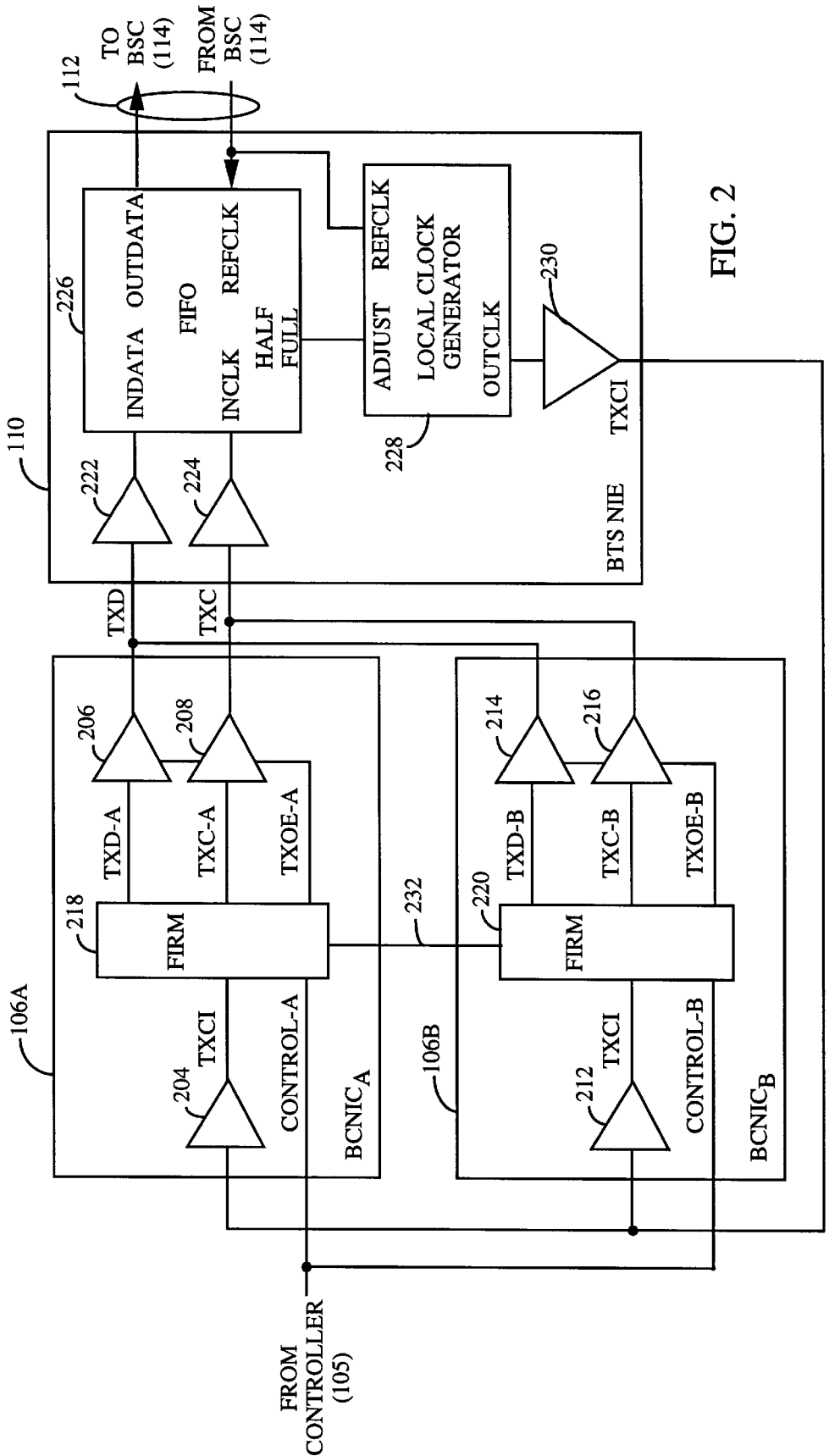
FIG. 2 is a block diagram of the system of the present invention.
Figure 4:
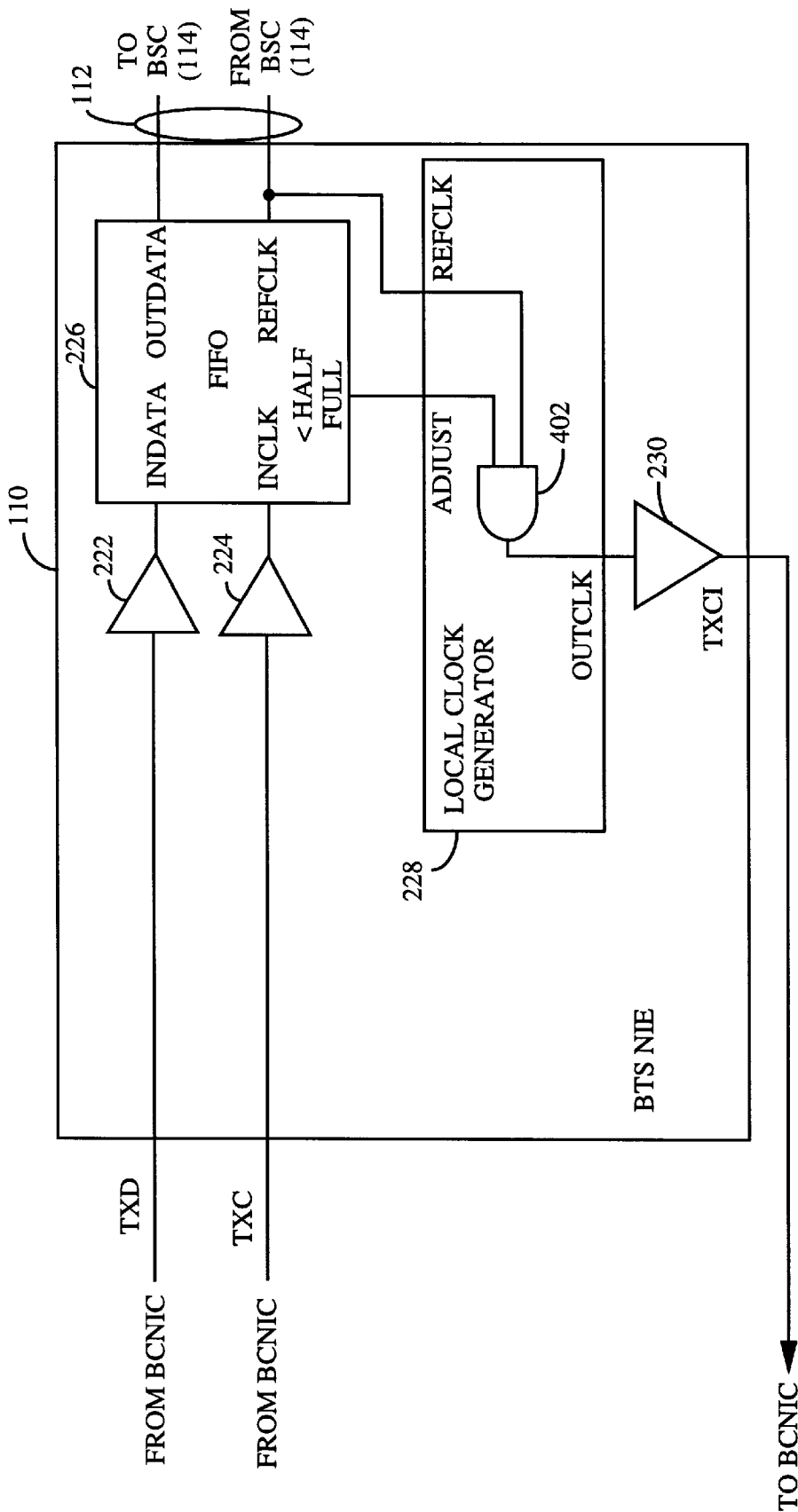
FIG. 4 is a block diagram of a first embodiment of the local clock generator of the present invention.
Figure 5:
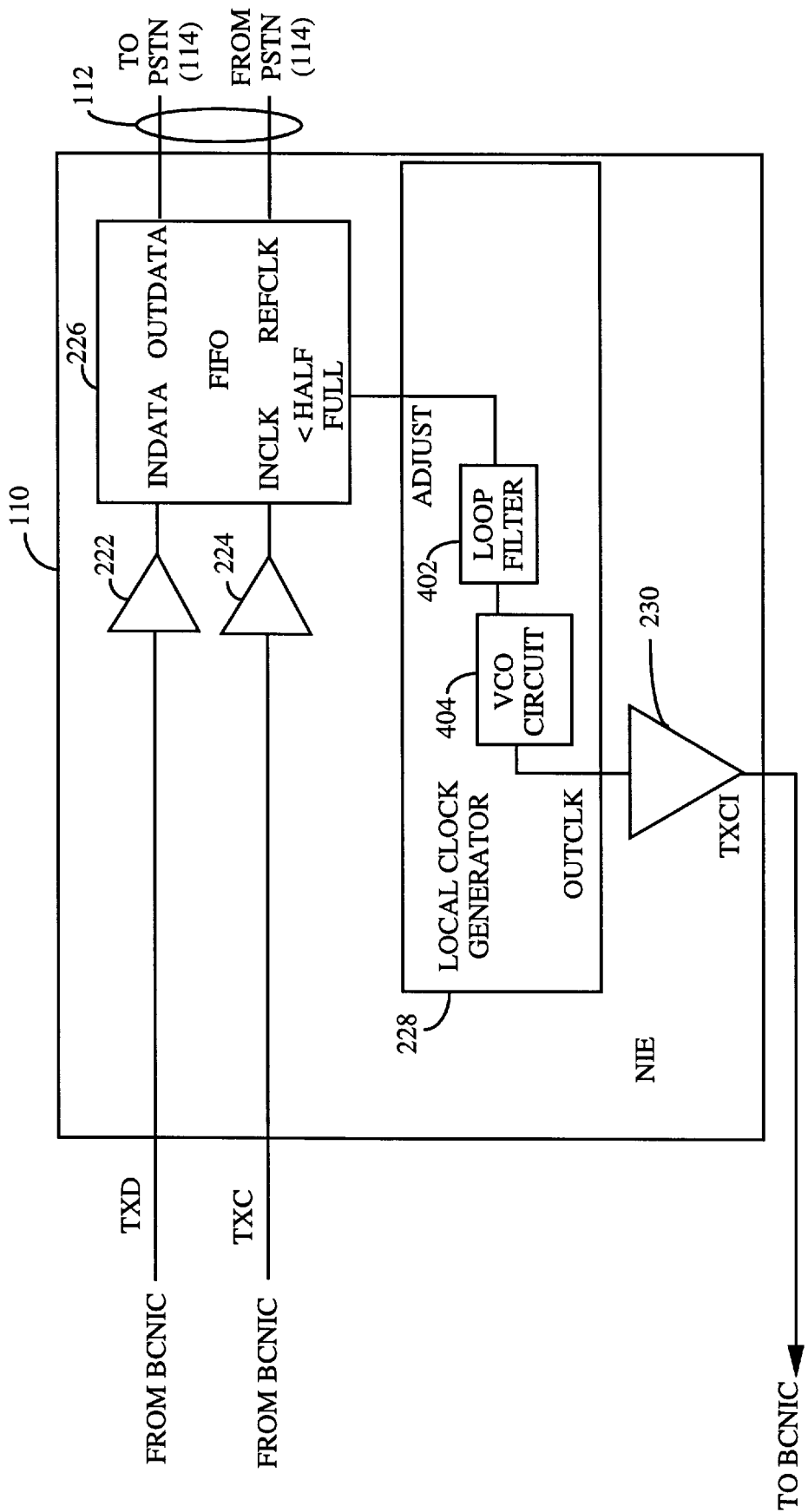
FIG. 5 is a block diagram of a second embodiment of the local clock generator of the present invention.

Referring now to FIG. 2, a block diagram of the apparatus of the present invention, embodied in one or more Base Station Communication Network Interface Cards (BCNIC) 106A–106B, and a BTS Network Interface Element (NIE) 110 such as an IMUX or C/DSU, is shown. As previously described, a network reference clock signal is provided by the BSC NIE 116 over T1, line 112 according to T1, format protocols which are well known in the art. The network reference clock signal is input to BTS NIE 110, where it is routed to the REFCLK inputs of both FIFO 226 and local clock generator 228. It should be noted that in the T1, format, both clock and data signals are transmitted on a single pair. Thus, the network reference clock signal provided to the REFCLK input of FIFO 226 and local clock generator 228 are typically extracted from the combined data/clock signal by a clock extractor (not shown). However, since the format of network reference clock signal may be varied without departing from the present invention, FIGS. 2, 4 and 5 are illustrated without the clock extractor.

In response to at least the network reference clock signal, local clock generator 228 generates a local transmit clock signal, TXCI, which is provided to both BCNIC 106A and BCNIC 106B through their respective clock buffers 204 and 212. It should also be noted that the local clock generator, in alternate embodiments, may obtain a reference clock signal from its own internal oscillator (not shown), or another stable clock reference such as a GPS receiver (not shown). Furthermore, the local clock generator may also include a multiplexing switch to switch between various clock references. However, since the source of the reference clock signal may be varied without departing from the present invention, FIGS. 2, 4 and 5 are illustrated without a multiplexing switch, or a GPS receiver, or other alternate reference clock signal.

In the preferred embodiment, BCNIC 106A and 106B are identical resources, and N+1 redundant with the remainder of the BCNICs 106N. In response to the TXCI clock signal, data signal TXD-A is clocked from FIRM 218 of BCNIC 106A. Likewise in response to the TXCI clock signal, data signal TXD-B is clocked from FIRM 220 of BCNIC 106B. It should be noted that all buffers shown in FIG. 2 may be differential RS-422 drivers or the like, even though they are depicted as single-ended devices for the sake of clarity and simplicity of the disclosure.

FIRM 218 and 220 are, in the preferred embodiment, processor ASICs which format data signals from BTS 102 into a High Level Data Link Communication (HDLC) format. The FIRM 218 and 220 format the data into HDLC data frames separated by at least one HDLC sync flag consisting of a unique pattern. For example, in the preferred embodiment, the HDLC sync flag unique pattern is "01111110". The HDLC formatted data signals TXD-A and TXD-B, respectively, are the clocked out of FIRM 218 and 220 through data buffers 206 and 214 onto the data connection TXD when their respective output enable signals, TXOE-A and TXOE-B are high. Similarly, the respective clock signals TXC-A and TXC-B, each derived from TXCI, are respectively clocked out of FIRM 218 and 220 through clock buffers 208 and 216 onto clock connection TXC when their respective output enable signals, TXOE-A and TXOE-B are high.

The data on data connection TXD and the clock signal on clock connection TXC are input to BTS NIE 110 through buffers 222 and 224, respectively, and provided to FIFO 226. FIFO 226 clocks in the incoming data to its write pointer through its data input port INDATA, in step with the local transmit clock signal provided on the clock connection TXC. FIFO 226 clocks out the data from its read pointer through its data output port OUTDATA, in step with the network reference clock signal provided at its REFCLK port. Thus, the FIFO clocks data in and out according to separate clock signals, which may or may not be synchronized with each other as will be explained further below.

When switching between BCNIC 106A as a data source and BCNIC 106B as a data source, such as is the case during a failure of BCNIC 106A or during routing maintenance "roving" as described in the above-mentioned patent application Ser. No. 08/513,306, controller 105 instructs FIRM 218 and FIRM 220, over control lines CONTROL-A and CONTROL-B respectively, to perform the switch according to the timing diagram of FIG. 3. FIRM 218 and 220 thereafter execute the switch-over by coordinating over control line 232.

Figure 3:
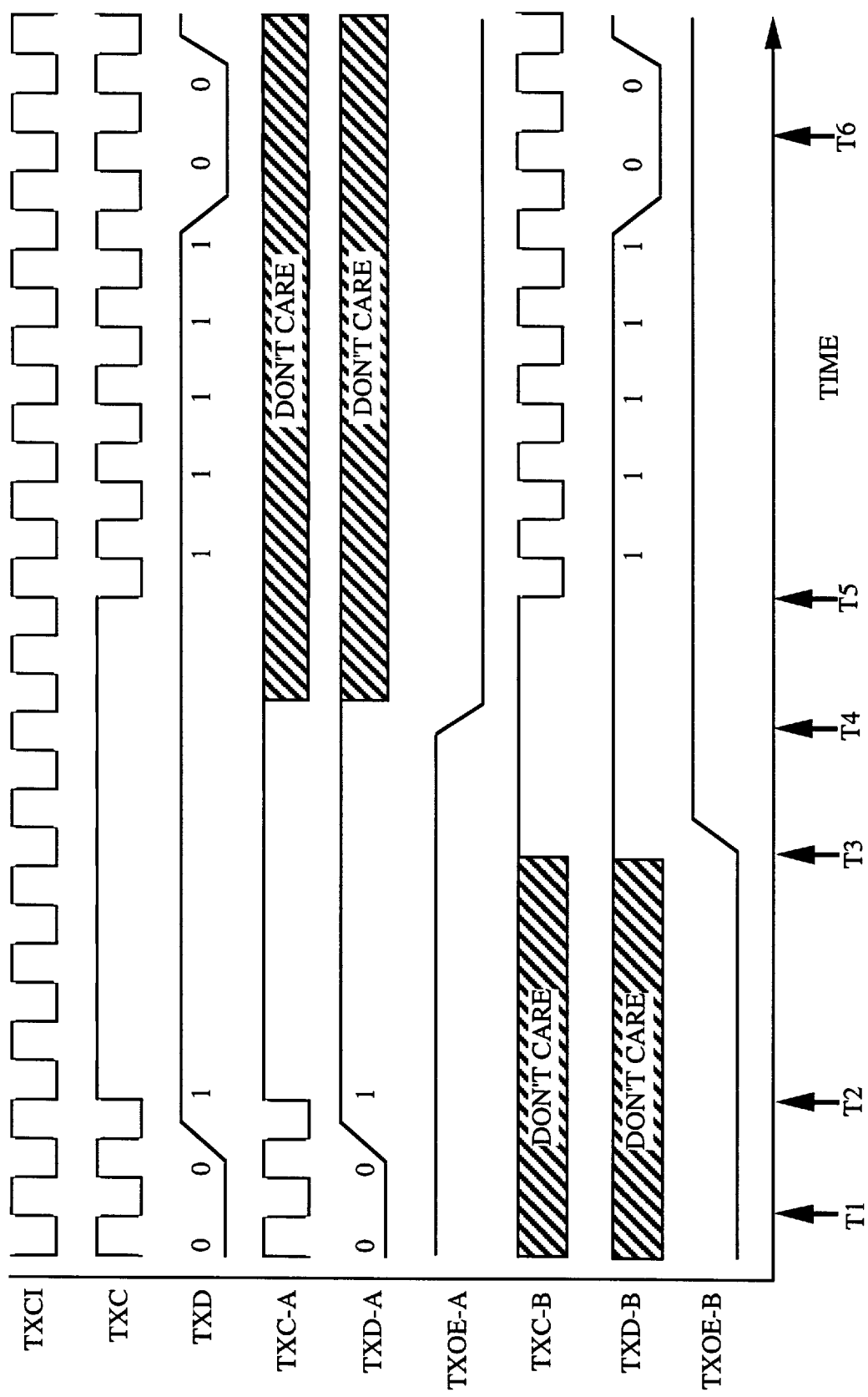
FIG. 3 is a timing diagram of selected data and clock signals of the present invention over time, illustrating the seamless switching of the present invention.

FIG. 3 illustrates the timing scheme of the present invention when switching between two redundant BCNICs 106A and 106B. Each of the relevant clock and data signals from FIG. 2 are listed along the left hand axis, as a function of time. In the example shown in FIG. 3, the system is switching between BCNIC 106A, which is "on-line" at the beginning of the time sequence, and BCNIC 106B which is "off-line" at the beginning of the time sequence. At the beginning of the timing sequence, at the leftmost margin of the graph, the clock signal TXC-A of BCNIC 106A is being derived from TXCI, and is approximately 180 degrees out of phase with TXCI. The data signal TXD-A of BCNIC 106A is low, and the output enable TXOE-A of BCNIC 106A is high. Thus, at the beginning of the graph time, BCNIC 106A clocking out data onto data connection TXD and clock pulses onto clock connection TXC. The output enable TXOE-B of BCNIC 106B is low, and thus it is not driving any data or clock signals out onto data connection TXD or clock connection TXC.

In this example, time T1, marks the end of a first HDLC sync flag, and the beginning of a second HDLC sync flag. At time T2, FIRM 218 begins the "make before break" switching process by locking TXC-A high, thereby freezing the present state of the data TXD-A high (on the first "1" of the HDLC sync flag) and holding both connections TXC and TXD high. At some later time T3, FIRM 220 of the previously "off-line" BCNIC 106B enables TXOE-B high, and holds both clock signal TXC-B and data signal TXD-B high, thereby matching the signal level already present on both connections TXC and TXD. Thus, from time T3 to time T4, both BCNIC 106A and 106B are holding clock and data connections TXC and TXD high.

At time T4, FIRM 218 drives its output enable TXOE-A low, thereby releasing control of both data connection TXD and clock connection TXC and going "off-line". At some time T5 thereafter, FIRM 220 stops holding clock signal TXC-B high, and begins clocking data signal TXD-B out onto data connection TXD. Note that in the exemplary implementation of FIG. 3, the data being clocked out on TXD-B and thus connection TXD is the remaining portion of the second HDLC sync flag that was begun by the "on-line" BCNIC 106A back at time T1. At time T6, the second HDLC sync flag ends, and either a third HDLC sync flag, or a normal HDLC data frame begins. Thus, the present invention provides an error-free switching method by "gapping" the clock and data signal long enough to ensure a reliable "make before break" switch between the redundant data sources. Furthermore, since both TXC and TXD are held high during the switchover, they are prevented from "floating" at an unknown level, possibly causing data errors. Also, during the "make before break" switching, both the data connection TXD and the clock connection TXC could be held low, rather than high, so long as the connections were not "floating."

It should be noted that in the preferred embodiment, the duration of the "gap" in the data and clock signals (i.e. the amount of time they are held high for switching purposes) should be no more than six cycles of the local transmit clock signal TXCI in order to provide the most reliable switching. It should be further noted that although the switch is triggered by the "on-line" BCNIC 106A detecting the beginning of an HDLC sync flag in the exemplary timing scheme provided in FIG. 3, the method of present invention may occur at any other time. Furthermore, the present invention is not dependent on the particular formatting of the data. It is possible to use the present invention to perform a reliable "make before break" switch at other times besides frame boundaries, including during the transmission of actual user data. However, in the preferred embodiment, the HDLC sync flag is used.

Recalling the synchronous nature of the system in which the present invention is operating, there is one effect of using the above-described method to seamlessly rove between redundant BCNICs that should be corrected for. As was previously mentioned, the clock signal on clock connection TXC clocks the data from data connection TXD to the write pointer of FIFO 226. Thus, when there are "gaps" in the clock signal during switching while TXC is held at a high logic level, no data is being clocked into FIFO 226. However, the network reference clock signal from BSC 114 continues to clock data out of FIFO 226 onto T1, line 112. Clearly, after some period of time which is proportional to the depth of FIFO 226, it would underflow, causing undesirable data errors and re-synchronization delay upon reset. To prevent this underflow caused by the seamless switching "gaps", the present invention also provides a method and system for adjusting the clock signal TXCI to equalize the average data rate of the being clocked into FIFO 226 with the average data rate of the data being clocked out of FIFO 226.

FIG. 4 illustrates a first embodiment of the clock signal adjusting system of the present invention. In FIG. 4, local clock generator 228 includes AND gate 402. AND gate 402 has a first input coupled to the REFCLK port for receiving the network reference clock signal provided by BSC NIE 116, and a second input coupled to the ADJUST port for receiving a logic level indicating the state of FIFO 226. Specifically, FIFO 226 has a status port "<HALF FULL" which goes high when the FIFO is less than half full. For example, in a 1K by 1 FIFO, the "<HALF FULL" signal would go high when the FIFO had less than 512 bits of data stored in it. It should be noted that the status indication signal could also be the inverse, ">HALF FULL", or some other measure of fullness level including one based on the absolute number of bits in the FIFO such as "FIFO> or <256 bits full" or a different relative fullness level such as "FIFO> or <⅔ full". It should also be noted that it would be a simple design matter to replace AND gate 402 with any other sequential or combinatorial logic circuit or state machine which performs the steps disclosed herein. However, for clarity and simplicity of disclosure, the logic circuit of local clock generator 228 is illustrated in FIG. 4 as comprising an AND gate 402.

This first embodiment of the present invention allows the FIFO 226 to "catch up" with the external network demand by taking advantage of the specific nature of the T1, framing format. As previously mentioned, a conventional NIE does not replicate the network reference clock signal to the BTS DISCO 104 for every 193rd bit because the T1, framing format specifically reserves this 193rd bit for overhead signaling or synchronization use. However, BTS NIE 110, through the operation of local clock generator 228, purposely does replicate all network reference clock signal pulses, including the 193rd clock pulse, when the FIFO 226 is less than half full. In this manner, the average rate of the local clock signal TXCI is increased by a factor of 193/192 with respect to the network reference clock signal as long as the FIFO is less than half full. This allows the average data rate at the input INDATA of FIFO 226 to "catch up" with the average data rate at the output OUTDATA of FIFO 226 when executing the seamless switching method described above with reference to FIG. 3.

FIG. 5 illustrates a second embodiment of the clock signal adjusting system of the present invention. In FIG. 5, local clock generator 228 includes loop filter 402 and voltage-controlled oscillator (VCO) circuit 404. Loop filter 402 has an input coupled to the ADJUST port for receiving the "<HALF FULL" signal from FIFO 226. The "<HALF FULL" signal in this second embodiment operates the same as in the first embodiment of FIG. 4, i.e. it goes to a logic level high when the FIFO 226 is less than half full. Loop filter 402 performs a low-pass filtering or integrating operation on the "<HALF FULL" signal provided by FIFO 226 and presents the resulting smoothed signal to VCO circuit 404 as a control voltage. The VCO circuit 404 includes at least a VCO which is responsive to the control voltage provided by loop filter 402. VCO circuit 404 may also include other components as are known in the art for scaling the control voltage as necessary, and for ensuring that the output TXCI from OUTCLK is a proper square wave.

When the FIFO 226 is less than half full, and the "<HALF FULL" signal goes high, loop filter 402 provides an increased voltage to VCO circuit 404. In proportional response to the increased control voltage, VCO circuit 404 increases the frequency of its local transmit clock signal output TXCI, causing a resultant increase in the average rate of data being clocked into the FIFO 226 from the data connection TXD. In this manner, the clock feedback loop from the FIFO to the BCNICs 106A and 106B keeps the FIFO 226 from underflowing. Conversely, when the FIFO 226 is not less than half full, and the "<HALF FULL" signal goes low, the loop filter 402 provides a decreased voltage to VCO circuit 404. In proportional response to the decrease in the control voltage, VCO circuit 404 decreases the frequency of its local transmit clock signal output TXCI, causing a resultant decrease in the average rate of data being clocked into the FIFO 226 from the data connection TXD. In this manner, the clock feedback loop from the FIFO to the BCNICs 106A and 106B keeps the FIFO 226 from overflowing. In both cases, the average rate of the data into FIFO 226 is equalized with the average rate of the data out of FIFO 226.

Figure 6:
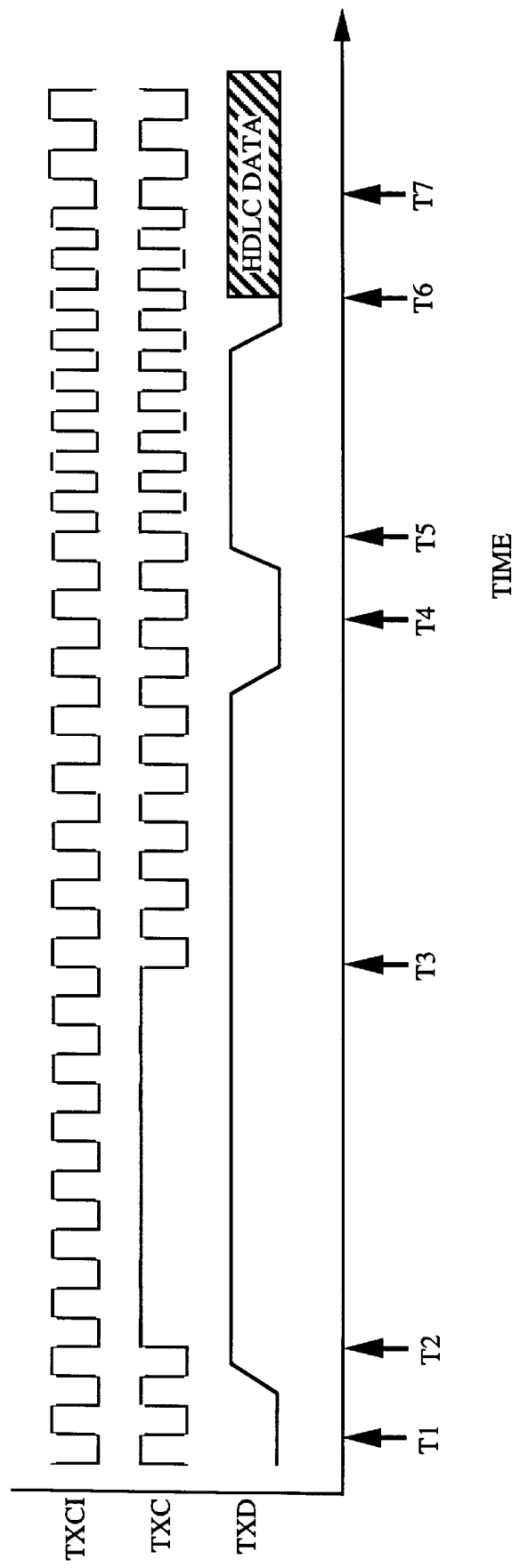
FIG. 6 is a timing diagram of selected data and clock signals of the present invention over time, illustrating the gap recovery scheme of the present invention.

FIG. 6 illustrates an overview of the timing sequence of the present invention, showing the "gapping" of the data and clock input to FIFO 226 and the subsequent increase in the average input data rate to FIFO 226 which avoids FIFO underflow. As in FIG. 3, the timing diagram begins at time T1, with the end of a first HDLC sync flag, and the beginning of a second HDLC sync flag. Between times T2 and T3, clock connections TXC and TXD are held high, "gapping" the clock during the "make before break" switch between BCNIC 106A and 106B as previously described. Between times T3 and T4, the oncoming BCNIC 106B completes the transmission of the second HDLC sync flag as previously described. Due to the "gap" in the data coming into FIFO 226, its "<HALF FULL" signal goes high by time T5, and remains high until time T7, causing the average clock rate TXCI, and thus the average rate of clock connection TXC to increase, increasing the average rate of data into FIFO 226. At time T6, a third HDLC flag ends, and normal HDLC framed data begins. It should be noted that the increased clock rate of TXCI and thus TXC may overlap HDLC frame boundaries as shown in FIG. 6.

In summary, the present invention provides a reliable method and system for switching between two data sources in a synchronous data communication system. The present invention provides a reliable high-speed data system that can reliably switch between redundant data sources without introducing data errors. Although the present invention has been disclosed with reference to an exemplary wireless communication system, it is clear that its teachings are equally applicable to other applications, such as local area networks, fixed communication systems, and any other system where multiple data sources may be switched onto the same transmit connection. Conversely, the teachings of the present invention are also applicable with respect to data reception, i.e. switching between two redundant data receivers.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A system for synchronously communicating data to a network having a reference clock signal, the system comprising:

first and second data sources, each coupled to a data connection and a clock connection, each for transmitting a data signal on said data connection and a transmit clock signal on said clock connection;

a FIFO, coupled to said data connection and said clock connection and said network, for receiving said data signal in response said transmit clock signal, and for providing said data signal to said network in response to said reference clock signal, said FIFO generating a status indication signal; and a local clock generator, coupled to said network and said FIFO and said first and second data sources, for generating said transmit clock signal in response to said reference clock signal and said status indication signal.

2. The system of claim 1 further comprising a controller for switching between said first and second data sources.

3. The system of claim 2 wherein each of said first and second data sources holds said transmit clock signal at a predetermined logic level for longer than a duration of a single period of said reference clock signal when switching between said first and second data sources.

4. The system of claim 3 wherein each of said first and second data sources holds said data signal at a predetermined logic level for longer than a duration of a single period of said reference clock signal when switching between said first and second data sources.

5. The system of claim 4 wherein said first and second data sources each comprise a processor for formatting said data signal to a predetermined data format, said predetermined data format having data frames demarked by sync flags.

6. The system of claim 5 wherein said controller switches between said first and second data sources only during one of said sync flags.

7. The system of claim 1 wherein said status indication signal indicates a fullness level of said FIFO.

8. The system of claim 7 wherein said local clock generator alters an average rate of said transmit clock signal in response to said status indication signal.

9. The system of claim 8 wherein said local clock generator increases an average rate of said transmit clock signal when said FIFO contains less than a predetermined number of data bits.

10. The system of claim 9 wherein said local clock generator decreases and average rate of said transmit clock signal when said FIFO contains more than a predetermined number of data bits.

11. The system of claim 10 wherein said predetermined number of data bits is approximately one-half of a data bit capacity of said FIFO.

12. The system of claim 8 wherein said local clock generator comprises a logic circuit having a first input coupled to said network for receiving said reference clock signal, a second input coupled to said FIFO for receiving said status indication signal, and an output for providing said transmit clock signal to said first and second data sources.

13. The system of claim 12 wherein said logic circuit suppresses one of every N pulses of said reference clock signal if said FIFO contains more than a predetermined number of data bits.

14. The system of claim 13 wherein said logic circuit does not suppress any of said reference clock signal pulses if said FIFO contains less than a predetermined number of bits.

15. The system of claim 14 wherein said logic circuit comprises an AND gate.

16. The system of claim 8 wherein said local clock generator comprises a voltage controlled oscillator (VCO) circuit having an input coupled to said FIFO for receiving said status indication signal and an output for providing said transmit clock signal to said first and second data sources.

17. The system of claim 16 wherein said VCO circuit varies a frequency of said transmit clock signal in response to a voltage level of said status indication signal.

18. The system of claim 17 further comprising a loop filter having an input coupled to said FIFO for receiving said status indication signal and an output coupled to said input of said VCO circuit and interposed therebetween, said loop filter for filtering said status indication signal.

* * * * *